United States Patent
Dreher et al.

[15] 3,642,067
[45] Feb. 15, 1972

[54] INHIBITING SALT WATER INTRUSION INTO FRESH WATER AQUIFERS

[72] Inventors: Karl D. Dreher; Robert D. Sydansk, both of Littleton, Colo.

[73] Assignee: Marathon Oil Company, Findlay, Ohio

[22] Filed: July 23, 1970

[21] Appl. No.: 57,827

[52] U.S. Cl. ..........................................166/275, 166/305 R
[51] Int. Cl. ......................................................E21b 43/22
[58] Field of Search............166/275, 274, 273, 305 R, 305 D, 166/294

[56] References Cited

UNITED STATES PATENTS

| | | | |
|---|---|---|---|
| 2,356,205 | 8/1944 | Blair, Jr. et al. | 166/305 R |
| 3,152,640 | 10/1964 | Marx | 166/305 D X |
| 3,275,075 | 9/1966 | Gogarty et al. | 166/274 |
| 3,297,085 | 1/1967 | Herring | 166/273 |
| 3,318,380 | 5/1967 | Tenny | 166/305 D |
| 3,379,260 | 4/1968 | O'Brien | 166/305 D X |
| 3,380,522 | 4/1968 | Payne, Jr. et al. | 166/268 |
| 3,400,761 | 9/1968 | Latimer, Jr. et al. | 166/294 X |
| 3,412,791 | 11/1968 | Gogarty | 166/273 |

*Primary Examiner*—Stephen J. Novosad
*Attorney*—Joseph C. Herring, Richard C. Willson, Jr. and Jack L. Hummel

[57] ABSTRACT

Intrusion of saline waters into fresh water aquifers is inhibited by injecting into the aquifer in advance of the major portion of the saline water, a micellar dispersion comprised of a surfactant containing a cation which can be replaced in situ by a major cation within the saline water. For example, a micellar dispersion (containing a sodium petroleum sulfonate) is injected into an aquifer and upon contact with magnesium cation within the intruding saline water, the magnesium cation replaces the sodium cation and, as a result, the viscosity of the micellar dispersion increases substantially. The effect of the replacement of the cation is to form a very viscous material within the aquifer to inhibit saline water intrusion.

10 Claims, No Drawings

INHIBITING SALT WATER INTRUSION INTO FRESH WATER AQUIFERS

BACKGROUND OF THE INVENTION

1. Field of the Invention

This invention relates to inhibiting salt water intrusion into fresh water aquifers. Such is obtained by pumping a micellar dispersion into the fresh water aquifer. The micellar dispersion is designed with a surfactant containing a cation that can be easily replaced in situ by a major cation (s) within the saline water. A very viscous mixture is obtained—thus preventing the salt water from intruding into the aquifer.

2. Prior Art of the Invention

Coastal regions contiguous to saline water are experiencing salt water intrusion into fresh water aquifers as the fresh water aquifer is pumped of its fresh waters. The intrusion of the saline water renders the fresh water brackish and generally unsuitable for domestic uses. This problem has been accelerated due to the increase in demand on fresh water.

Copending U.S. Pat. application Ser. No. 874,169, filed Nov. 5, 1969, to Tosch, teaches a method of inhibiting salt water encroachment by introducing into the fresh water aquifer a micellar dispersion which has the characteristic of forming a very viscous material upon contact with the saline water.

U.S. Pat. No. 3,380,522 teaches a method of stopping the horizontal advance of saline water into a fresh water aquifer by injecting into the aquifer a slurry containing granular materials such as reclaimed oil well drilling muds and sedimentary clay from the ocean floor. Such materials form an impermeable bridging mass in the aquifer to block the intruding saline water.

Applicants have discovered a novel design of a micellar dispersion useful to inhibit the intrusion of saline water into fresh water aquifers.

SUMMARY OF THE INVENTION

A micellar dispersion containing a surfactant having a cation that can be easily replaced in situ by a major cation within the introducing saline water is injected into a fresh water aquifer. Upon contact of the micellar solution with the saline water, the major cation within the saline water replaces the cation on the surfactant resulting in a mixture that is substantially more viscous than the original micellar dispersion injected into the fresh water aquifer. The overall effect is to inhibit the intrusion of saline water into the fresh water aquifer.

DESCRIPTION OF THE PREFERRED EMBODIMENTS

The micellar dispersion is comprised of hydrocarbon, aqueous medium and surfactant. Optionally, cosurfactant (also identified as semipolar organic compound and cosolubilizer) and/or electrolyte can be incorporated within the micellar dispersion. Examples of volume amounts include about 1 to about 85 percent hydrocarbon, about 10 to 95 percent aqueous medium, at least about 4 percent surfactant, about 0.001 to about 20 percent cosurfactant, and about 0.001 to about 5 percent by weight (based on the aqueous medium) of electrolyte. Examples of micellar dispersion useful with the invention are found in U.S. Pat. Nos. 3,254,714 to Gogarty et al.; 3,297,084 to Gogarty et al.; 3,307,628 to Sena; 3,330,343 to Tosch et al.; 3,412,791 to Gogarty; 3,497,006 to Jones et al.; 3,506,070 to Jones; etc.

the surfactants preferred in this invention are petroleum sulfonates and more preferably the sodium and ammonium petroleum sulfonates. The cation on the petroleum sulfonate can be replaced by a cation that is higher in the sequence, from left to right, within the following group:

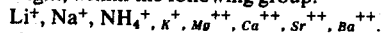

$Li^+, Na^+, NH_4^+, K^+, Mg^{++}, Ca^{++}, Sr^{++}, Ba^{++}$.

For example, a micellar dispersion containing a sodium petroleum sulfonate is injected into a reservoir. Upon contact with a saline water containing magnesium and/or calcium cation, the sodium cation of the sulfonate is replaced in situ by the calcium or magnesium cation resulting in a material that is more viscous than the original micellar dispersion. This phenomenon can be explained by the fact that for micellar dispersions having the same "makeup," but containing petroleum sulfonates of different cations, a dispersion containing lithium petroleum sulfonate exhibits a lower viscosity than a micellar dispersion containing an ammonium petroleum sulfonate. In turn, a micellar dispersion containing a calcium petroleum sulfonate exhibits a higher viscosity than the dispersion containing the ammonium petroleum sulfonate. The above sequence of cations is merely representative of a few cations. It is understood that additional cations can be incorporated into this sequence.

Micellar dispersions useful with this invention are oil-external, i.e., the external phase of the micellar dispersion acts like it is oleophilic.

Saline water can contain many different cations. A representative sample of sea water contains sodium, potassium, magnesium, calcium and strontium. The arrangement of the above cations in decreasing cation concentration are sodium, magnesium calcium, potassium, and strontium.

The initial viscosity of the micellar dispersion should be sufficiently low to facilitate its being pumped down an injection means (e.g., well) into the fresh water aquifer. Preferably, the micellar dispersion is injected into the aquifer in such a manner to traverse or bridge at least a major portion of the intruding saline water. That is, if the saline water is directly intruding into a horizontal aquifer, then the micellar dispersion is desirably injected into the aquifer preferably as a bridging mass that traverses the intruding saline water. This can be effected by having a series of injection means traversing the intruding saline water and then injecting the micellar dispersion in appropriate injection means such that the volume of micellar dispersion completely traverses or substantially traverses as a continuous barrier the fresh water aquifer. Methods of injecting the micellar dispersion and the different arrangements of injection means to insure a "line" drive are known in the art. Also, it is contemplated that only a portion of the aquifer need be traversed with the micellar dispersion to protect it. In addition, it is contemplated that the fresh water aquifer can be protected by a circular or continuous boundary around the area of the fresh water aquifer to be protected.

The injection of the micellar dispersion into the formation can be accomplished by conventional pumping means. Also, if a relatively high-viscosity micellar dispersion is pumped into the aquifer, a veneer of water or water-containing surfactants can be injected around the micellar dispersion so that the dispersion can be easily pumped down the well bore. The prior art teaches numerous means of accomplishing this.

After the micellar dispersion is injected into the aquifer, the intruding saline water contacts the micellar dispersion and the replacement cation displaces in situ the cation on the surfactant molecule, resulting in a more viscous micellar dispersion. The micellar dispersion will "takeup" or "solubilize" a portion of the water from the intruding saline water, i.e., until an equilibrium condition is attained; thereafter, the dispersion may not takeup more water and it is postulated that it remains in equilibrium with the interstitial fluids. In equilibrium with the saline water, the micellar dispersion is substantially more viscous than the initial micellar dispersion pumped into the aquifer.

The following examples illustrate specific working embodiments of the invention. Unless otherwise specified, all percents are based on volume.

EXAMPLE 1

A micellar dispersion containing 8 percent ammonium petroleum sulfonate having an average equivalent weight of 420, 70 percent water (contains 1,500 p.p.m. of dissolved solids) and 22 percent crude oil, has an initial viscosity of about 40 cp. at ambient temperature. A typical saline water from one of the coastal regions has the following analysis:

Cation     % by Weight Concentration

| | |
|---|---|
| Sodium | 1.047 |
| Potassium | 0.038 |
| Magnesium | 0.128 |
| Calcium | 0.041 |
| Strontium | 0.0013 |

After the micellar dispersion is mixed with equal volumes of the saline water, the resulting micellar dispersion exhibits a viscosity resembling that of a gel.

EXAMPLE 2

A micellar dispersion containing 10 percent sodium petroleum sulfonate having an average equivalent weight of 440, 60 percent water containing 6,000 p.p.m. of dissolved salts, and 30 percent crude oil has a viscosity of about 35 cp. at ambient temperature. About 0.35 percent by weight of calcium chloride (based on the micellar dispersion) is mixed with the micellar dispersion, the latter has a viscosity of about 125 cp. at ambient temperature. This example illustrates that all of the sodium cation on the petroleum sulfonate does not have to be replaced in order to obtain a more viscous mixture. That is, amounts less than the stoichiometric amount of the original cation on the petroleum sulfonate are useful to obtain a very viscous micellar dispersion.

What is claimed is:

1. A method of inhibiting the advance of saline water into a fresh water aquifer in fluid communication with at least one injection means, comprising injecting into the aquifer an oil-external micellar dispersion comprised of hydrocarbon, aqueous medium and surfactant containing a cation that can be displaced by a cation within the saline water, permitting the micellar dispersion and the saline water to come in contact with each other in the aquifer so that at least partial replacement of the sulfonate cation is effected to obtain a substantially more viscous mixture than the injected micellar dispersion, the result being to inhibit the advance of the intruding saline water.

2. The method of claim 1 wherein the micellar dispersion contains cosurfactant and/or electrolyte.

3. The method of claim 1 wherein the surfactant is a petroleum sulfonate.

4. The method of claim 1 wherein the surfactant is ammonium petroleum sulfonate and/or sodium petroleum sulfonate.

5. The method of claim 1 wherein the saline water contains at least one cation selected from the group consisting of magnesium, calcium and strontium.

6. The method of claim 1 wherein the micellar dispersion is injected into the aquifer through at least one injection means and positioned in the aquifer by controlling the removal of fluids from at least one other well in fluid communication with the aquifer.

7. A method of inhibiting the intrusion of saline water into a substantially horizontally extending fresh water aquifer between substantially impermeable strata within a subterranean formation, the method comprising injecting into the aquifer an oil-external micellar dispersion comprised of a surfactant containing a cation that can be displaced by a cation within the saline water, permitting the micellar dispersion and the saline water to mix sufficiently so that the cation exchange is effective to obtain a more viscous micellar dispersion and thus inhibit the advance of the saline water into the fresh water aquifer.

8. The method of claim 7 wherein the surfactant is ammonium petroleum sulfonate and/or sodium petroleum sulfonate.

9. The method of claim 7 wherein the micellar dispersion contains hydrocarbon, aqueous medium and petroleum sulfonate.

10. The method of claim 9 wherein the micellar dispersion contains cosurfactant and/or electrolyte.

* * * * *

UNITED STATES PATENT OFFICE
CERTIFICATE OF CORRECTION

Patent No. 3,642,067    Dated February 15, 1972

Inventor(s) Karl D. Dreher et al

It is certified that error appears in the above-identified patent and that said Letters Patent are hereby corrected as shown below:

Col. 1, line 41:    Delete "introducing" and insert --intruding--.

Signed and sealed this 6th day of June 1972.

(SEAL)
Attest:

EDWARD M. FLETCHER, JR.
Attesting Officer

ROBERT GOTTSCHALK
Commissioner of Patents